US009875455B2

(12) United States Patent
Cassady et al.

(10) Patent No.: US 9,875,455 B2
(45) Date of Patent: Jan. 23, 2018

(54) PACKAGE DROP-OFF AND PICK-UP SYSTEM

(71) Applicant: HMC Solutions, North Little Rock, AR (US)

(72) Inventors: Tony Cassady, Rindge, NH (US);
James Faver, Little Rock, AR (US);
Donald Kemp, Little Rock, AR (US);
Blaine Nounamo, Little Rock, AR (US)

(73) Assignee: Anytime Depot, LLC, North Little Rock, AR (US)

( * ) Notice: Subject to any disclaimer, the term of this patent is extended or adjusted under 35 U.S.C. 154(b) by 47 days.

(21) Appl. No.: 14/747,462

(22) Filed: Jun. 23, 2015

(65) Prior Publication Data

US 2015/0302351 A1    Oct. 22, 2015

Related U.S. Application Data

(62) Division of application No. 14/258,182, filed on Apr. 22, 2014, now Pat. No. 9,120,624.

(51) Int. Cl.
*G06Q 10/08* (2012.01)
*B65G 1/137* (2006.01)

(52) U.S. Cl.
CPC ........ *G06Q 10/0836* (2013.01); *B65G 1/137* (2013.01); *G06Q 10/083* (2013.01)

(58) Field of Classification Search
USPC ........................................ 700/214
See application file for complete search history.

(56) References Cited

U.S. PATENT DOCUMENTS

| 3,721,063 | A | 3/1973 | Weimer |
| 4,567,359 | A | 1/1986 | Lockwood |
| 4,575,719 | A | 3/1986 | Bertagna et al. |
| 4,598,810 | A | 7/1986 | Shore et al. |
| 4,734,858 | A | 3/1988 | Schlafly |
| 4,758,714 | A | 7/1988 | Carlson et al. |
| 4,803,348 | A | 2/1989 | Lohrey et al. |
| 6,182,839 | B1 | 1/2001 | Robbins et al. |
| 6,578,671 | B2 | 6/2003 | Shen |
| 2004/0059618 | A1 | 3/2004 | Ford et al. |
| 2004/0158351 | A1 | 8/2004 | Rivalto |
| 2009/0302105 | A1 | 12/2009 | Cassady et al. |
| 2010/0325001 | A1* | 12/2010 | Barber ............ G06Q 30/06 705/17 |
| 2011/0161227 | A1 | 6/2011 | Santo, Jr. |
| 2013/0166060 | A1* | 6/2013 | Irwin ............ B65G 1/0485 700/214 |
| 2013/0166067 | A1* | 6/2013 | Irwin ............ B65G 1/0485 700/237 |

(Continued)

*Primary Examiner* — Kyle O Logan
(74) *Attorney, Agent, or Firm* — Lambert & Associates; Gary E. Lambert; David J. Connaughton, Jr.

(57) ABSTRACT

An automated storage and retrieval system for customers and vendors/service providers to pick up and drop off packages such as parcels, dry-cleaning/laundry, and the like. The present invention may provide a convenient point for users to pick up or drop off items. In varying embodiments, the system may be particularly useful in multi-unit residential buildings, retail stores and other store-fronts, as stand-alone kiosks in popular locations such as department stores, train stations, malls, street corners, and the like.

16 Claims, 6 Drawing Sheets

(56) References Cited

U.S. PATENT DOCUMENTS

| | | | |
|---|---|---|---|
| 2014/0058554 A1* | 2/2014 | Janet | B65G 49/00 700/214 |
| 2014/0108028 A1* | 4/2014 | Braun | B65G 35/00 705/2 |
| 2014/0229003 A1* | 8/2014 | Stoffel | B25H 3/00 700/237 |
| 2015/0120602 A1* | 4/2015 | Huffman | G06Q 10/083 705/339 |

* cited by examiner

PACKAGE DROP-OFF AND PICK-UP SYSTEM

BACKGROUND OF THE INVENTION

Field of the Invention

The present invention relates generally to item storage and retrieval systems. More particularly the present invention relates to a system that allows drop-off, pick-up, and/or storage of packages and similar items using an automated system.

Description of Related Art

Transport, retrieval and delivery of packages such as parcels, letters, dry cleaning, rental items, and the like, is a major part of the worldwide economy. While many solutions exist to drop off and pick up items, most involve either going into a store, or relying on something being dropped off or picked up at a doorstep or other insecure location. This raises a number of security issues, as well as a number of convenience issues. For example, if an item is dropped off at a person's door step, it may easily be stolen. This is particularly applicable in high density housing areas. Moreover, in many multi-unit apartment or condo buildings, direct delivery is not even possible. Further, when items must be dropped off or picked up in a store, the convenience is limited to only hours that the store is open. In many cases this can be very limited.

Therefore, what is needed is a system that may allow for dropping off and picking up items such as packages in an entirely automated manner, securely, with extensive access, such as 24/7.

SUMMARY OF THE INVENTION

The subject matter of this application may involve, in some cases, interrelated products, alternative solutions to a particular problem, and/or a plurality of different uses of a single system or article.

In one aspect, a package drop-off and pick-up system is provided. The system is contained mostly or entirely within a housing. Within the housing are a plurality of storage compartments, and a movement device configured to move the plurality of storage compartments within the housing. An access point allows access to the housing and storage compartments therein. The movement device is configured to move the compartments such that a desired compartment may be accessed through the access point. The access point is openable and closable through a door or similar. A computerized user interface is accessible on an outside of the housing. The user interface allows input and output relating to the actions of the system. Further, the user interface is in communication with the movement device and access point door (or similar) to automatically bring the compartment to the access point and open and/or close the access point to provide access to the compartment, and prevent access to the compartment once the user is finished.

In another aspect, a method of dropping off a package to the package drop-off and pick-up system is provided. The method beings with a computerized user interface receiving an item identifier from a user. This may be a code, bar code, item info, or the like. The computer(s) of the user interface may then calculate an optimum available compartment of the plurality of storage compartments based on a size of the package, the size of the package being input to the user interface either directly, or as part of the item identifier. A computerized controller in communication with the user interface and a motor may then activate the motor to rotate a carousel, conveyor, or other movement device until the desired storage compartment is aligned with at least part of the access point. A door or doors may be opened, either physically or unlocked, automatically by a controller in communication with the computerized user interface to provide access to the storage compartment. Once the storage compartment is accessible, the user interface may provide a prompt to instruct the user to place the package in the compartment. The computerized user interface may further be able to receive some sort of input to confirm that the package is placed in the compartment. This may be a direct user input, or a sensor may identify that the package is within the compartment. Finally, the door may be closed automatically or manually.

In yet another aspect, a method of picking up a package to the package drop-off and pick-up system is provided. The method begins with the computerized user interface receiving an identification code provided by a user. The computer(s) may then identify the at least one of the plurality of compartments corresponding to the input code. Once identified, a computer of the user interface may then activate a motor to bring the identified storage compartment in alignment with the access point. The controller in communication with the user interface may then open one or a plurality of doors to expose the storage compartment. A user may be prompted by an output to remove a package within the compartment, and then the doors may be closed.

DETAILED DESCRIPTION

Figure 1:
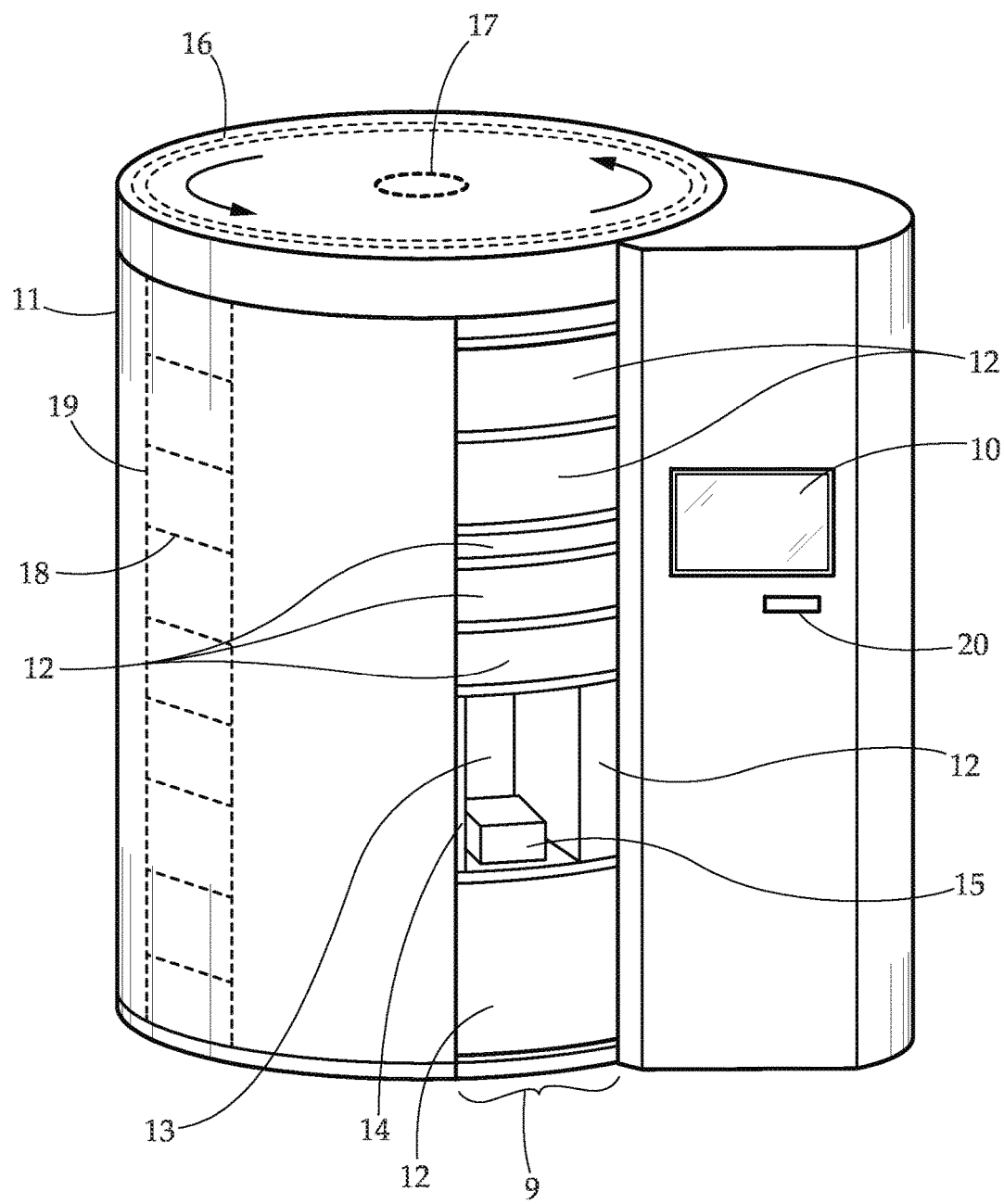
FIG. 1 provides a perspective view of one embodiment of the invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an automated storage and retrieval system for customers and vendors/service providers to pick up and drop off packages such as parcels, dry-cleaning/laundry, and similar items. The present invention may be particularly useful in multi-unit residential buildings, retail stores and other store-fronts, as stand-alone kiosks in popular locations such as department stores, train stations, malls, street corners, and the like to provide a convenient point for users to pick up or drop off items.

The pick-up and drop-off system contemplated herein may be used for any number of package applications including, but not limited to: dry cleaning/laundry pick-up and delivery, package pick-up and delivery, product pick-up and return, key pick-up and return, in-store product pickup, mail and parcel service, storage, and the like. The term "package" will be used herein generally and in a non-limiting manner to refer to any item capable of being used in the system for pick-up and drop-off, including, but not limited the previously listed applications.

The system contemplated herein comprises three main parts: The user interface, the user access portion, and the storage compartments.

In most embodiments, the system involves a user interface that allows users to access and interact with the system. An access point nearby to the user interface allows a user to access a storage compartment for picking up or dropping off an item therein. This storage compartment is one of many in the system housing. The compartment, along with other compartments is mounted on a movement device such as a carousel or conveyor. The movement device is in communication with the user interface, which instructs the movement device to move the appropriate compartment in front of the access point. The access point is openable and closeable through a door (or group of doors). The user interface and connected computer then opens the door(s) and allows access to the storage compartment.

The computerized user interface may be comprised of one or more computing devices in networked communication with each other. The computer or computers of the computerized user interface contemplated herein may comprise a memory, processor, and input/output system. In some embodiments, the computer may further comprise a networked connection and/or a display. These computerized elements may work together to provide functionality to the user interface.

The user interface may comprise one or more computers or computerized elements in communication working together to carry out the different functions of the system. The invention contemplated herein further may comprise non-transitory computer readable media configured to instruct a computer or computers to carry out the steps and functions of the user interface, as described herein.

The user interface may be any computerized interface capable of allowing a user to input data and receive a feedback. Data input may include personal information, information about the product to be dropped off or picked up, information about the storage compartment, payment information, and the like. The user interface may further provide outputs including instructions displayed on a screen, audible, or the like, a receipt, among others. In other embodiments, the user interface may include an on-site interface as well as an online interface, such that some information (such as personal information and payment information) may be collected online, while other information (such as a pick-up code, user identification, etc.) may be collected on-site.

The user interface may further be in communication with a computer controlled mechanism to move the storage compartments, via the movement device, to an appropriate position for access. In further embodiments, a computer controller may open a door or doors once the storage compartment of the user is properly positioned. In some embodiments, the user interface may have some sort of networked connection such as a WiFi, cellular, Ethernet, or phone connection to the internet and/or a centralized server. In these embodiments, the user interface may comprise off-site elements for added or enhanced functionality.

In one embodiment, the user interface may be configured as a touch screen monitor. The touch screen monitor may provide instruction (visual, audible, etc.) to a user, and may also accommodate user entry of personal information, package information, and the like. The user interface may have a computerized networked connection to a server or other computer that is configured to allow remote monitoring and control capabilities. This may allow for advanced troubleshooting, user assistance, customer service, and the like.

In one example of operation of the user interface, a user may pick-up a package stored in a particular storage compartment by entering a previously-provided code into the user interface. In another embodiment, a bar code reader may be included in the user interface to allow a user to scan a previously-provided barcode into the user interface computer.

In another example of operation, the user interface may be used to allow users to drop off a package. The user interface may be configured to receive a user input regarding the package to be dropped off. This information may include details of what is being dropped-off such as its size, weight, description, contents, a previously provided code, and the like.

In still another embodiment, the user interface may include an online component accessible through a website, application, or similar on an internet enabled computer of the user. In this embodiment, a user may visit the website (or similar) to identify the package. The user will then be given a code (such as a barcode, alphanumeric code, or the like). This code may then be entered into the user interface on the system on location. The user interface, given the code, may instruct the assigned storage compartment to be moved into a proper position and open the door(s) for loading of the package.

The code referenced in the above embodiment may be delivered to the user in any manner. For example, the code may be delivered by an email, text, phone message, letter, note, electronic message, or other similar communication.

In both of the previous embodiments, the computerized user interface may automatically assign a storage compartment for the user based on the input information.

Existing users, either vendors, those picking up, dropping off, or the like, may be registered and readily identifiably by the user interface. For example, the registered user may have a scannable bar-code, or inputtable code to identify them and associate their transaction with known, stored information. This may speed the transaction for those who are frequent users.

The access point of the system may be any openable and closable apparatus that allows a user access to a storage compartment from an outside of the system. Generally, the access point may be an opening defined by the housing coverable by a door, such as a sliding door, hinged door, or the like. This door may be controlled by the computerized user interface, and may open automatically to allow access. This opening may be a physical opening, or just an unlocking, among others. The door may then close or lock to prevent additional or unauthorized access. This closing may also be done automatically by the computerized user interface.

In one embodiment, the access point may be a plurality of doors that may slide between a fully open and fully closed position. This sliding may also be controlled by a computer in communication with the user interface. These doors may be partially openable as well, allowing one or a plurality of doors to fully or partially open to accommodate a plurality of different shapes and sizes of storage compartments. For example, the access point may be a large rectangular opening having a height and a width. The plurality of doors may be thin and long, and may extend across the width of the opening, covering the entire width and height. A storage compartment may be aligned at a top left corner of the opening, and the appropriate doors (say, three of ten) may open partially to fully expose the storage compartment. This may all be controlled by a computerized controller in communication with the user interface, to ensure that the proper opening, and only the proper opening is provided. As such, the doors may provide access to the user's designated storage compartment only.

In another example of the above embodiment, if a compartment is tall and thin, the compartment may be aligned with an edge of the access point opening, and all of the doors, or all those needed to provide access to the entire compartment may partially open. In still another embodiment, one or all of the plurality of doors may open fully to expose one or a plurality of authorized compartments.

In a particular embodiment, the storage compartments may be configured for a laundry and dry-cleaning drop-off/pick-up system. In this embodiment, the storage compartments may comprise dirty laundry compartments, clean folded clothing compartments, and hung clothing compartments. The dirty laundry compartments may be a drawer, or closable compartment that must be closed to assure that the dirty garments are completely contained within the compartment. This closure may be monitored by a sensor in electronic communication with the user interface. Once closed, the access point doors may be closed, and the garments may be ready for pickup. The other compartments may be for cleaned clothes. The user's dirty laundry may be cleaned and then loaded into either the folded clothing compartment (for folded laundry) and hung clothing compartments (for hung laundry). In many embodiments, the user, upon pickup of the cleaned laundry, may be assigned more than one compartment, such as a folded clothing compartment and hung clothing compartment. The computerized system may know this and allow access to the first compartment, and then the later compartments automatically.

In another embodiment, the system may further comprise an additional key dispensing feature in addition to, or as a type of the package pick-up/drop-off functionality. In this embodiment, the system may receive and dispense keys assigned to a user. The keys may be to provide access to a room, area, or the like. The keys contemplated herein may be key cards, traditional keys, FOB's, or any device that provides access to a room, area, or the like. The keys may be stored on a carousel or conveyor, with each key being assigned to a small storage area sized to receive the key. In one embodiment, the key storage area may be a small slot on a top of a carousel or conveyor system, with larger package storage areas below it. As with other embodiments of the system, the user may be assigned a code, and upon input of the code, the system's computerized user interface will operate the movement device to bring the associated key to a dispensing opening such as an openable door. For this and other package delivery embodiments, the key or other package may be accessible via a single slot into which the package/key is deposited. In one embodiment, an actuator such as a linear actuator may be used to remove the key from its slot and into a dispensing area.

The key dispensing embodiment may be particularly useful at hotels, or as an automated "lock-out" service at an apartment or condo building. In this way, building occupants can be assigned a code associated with their particular key. The code may be input into the user interface, which may activate the movement device to make the associated key accessible. The key may then be dispensed for the user's use.

In other, more basic embodiments, a door or plurality of doors may be manually unlocked and openable by the computer once the user's assigned compartment is moved to be behind the door(s). Once closed again, the door may be locked automatically.

In one embodiment wherein the doors open and close automatically, one or a plurality of safety sensors may be incorporated to prevent a door from closing at an inopportune time such as during loading or unloading.

As briefly described, a plurality of storage compartments may be positioned within a larger housing or may be otherwise contained within the housing of the system. These storage compartments are arranged on a structure such as a rack or similar system and are movable by a movement device such as a conveyor, carousel, or the like. In one embodiment, the compartments may be uniformly sized. In another embodiment, a plurality of different sized and shaped compartments may be available. Examples of different sized and shaped compartments may include a plurality of small rectangular compartments, medium rectangular compartments, and large compartments, as well as thin, tall rectangular compartments sized to store hung clothing on a clothes hanger. In some embodiments, these compartments may have internal doors, drawers, or the like. It should be understood that the storage compartments may be any size or shape, depending on needs of the system, and that the storage compartment size and shape is in no way limited by this disclosure.

The movement of the rack or similar assembly of storage compartments may be any structure or device capable of moving the storage compartments in line with the access point.

In smaller, kiosk type embodiments of the system, a carousel system may be employed to rotate the plurality of storage compartments into position in alignment with the access point. This carousel is configured with a central shaft, and the plurality of storage compartments being positioned on an outside of the carousel connected to the shaft. A motor is designed to rotate the carousel about its central shaft to orient the proper compartment by the access point. Typically, the motor's rotation may be controlled by a computer in communication with the user interface.

The carousel embodiment is generally more desirable in smaller free standing kiosk embodiments of the system. This is because the carousel can be transported as a complete unit, and is small enough to be shipped, moved, and installed quickly and easily.

In carousel embodiments, a housing for the system may be designed to match the rounded rotational shape of the carousel. In a further embodiment, doors at an access point may have a same radius of curvature as the rounded housing.

In larger, installed embodiments, such as embodiments of the system installed in stores, a conveyor system may be used. The conveyor system is typically formed of multiple parts, and can be scaled up or down depending on system needs, size constraints, and the like. Generally, conveyor embodiments will be installed in a building, and be positioned behind a wall or other secure structure. Access to the conveyor and system internal elements may be provided via secure access to a room behind the wall. In a particular embodiment, the plurality of storage compartments may be supported by an overhead conveyor that is movable along a track by a motor. A lower track may also guide the compartments in this embodiment to ensure their smooth and proper motion. In another embodiment, the orientation may be reversed, with the conveyor beneath the storage compartments, with a guide on the top.

As noted, the conveyor embodiment of the system may be larger and more scalable than the carousel embodiment. The conveyor is generally configured to be assembled on location and thus is formed of multiple parts and may be shaped in any way to fit its installation space.

In some embodiments, the storage compartments may include sensors such as a contact sensor, scale, or the like to determine if the compartment has been filled, how much is in it, and the like.

The system described herein may be used in any number of ways. For example, in one embodiment, the system may be targeted for use by consumers who live where packages and/or dry-cleaning cannot be easily delivered, and/or where drop off at their door is impractical or impossible. This may apply in particular to consumers not being home during the day, building security, not having a safe place for items to be left unattended, and the like. In another embodiment of use, the system may be used by shippers such as UPS® or FedEx® as a repository for items that they have attempted to deliver but could not because the recipient was not home. This embodiment may provide the addressee with a convenient place to pick up the item that is available 24/7.

Turning now to FIG. 1, a perspective view of a kiosk embodiment of the drop-off and pick-up system is provided. A housing 11 surrounds the system and forms the general kiosk structure. An access point 9 extends from a bottom to top of the housing 11, or nearly so. A plurality of doors 12 cover the housing. The doors 12 are horizontally slideable and controlled (openable and/or lockable) by the computerized user interface 10 of the system. In this embodiment, the doors 12 are different sized to correspond to different sizes of storage compartments 13. One door 12 is shown in an open position, exposing the storage compartment 13, part of a rack on which the storage compartment is held 14, and a package 15 within the storage compartment 13.

A computerized user interface 10 is shown in this embodiment as having a display screen positioned adjacent to the access point 9. Further, a bar-code scanner 20 in communication with the computerized user interface is also positioned nearby to the access point 9 on the housing 11. The display may be a touch screen, in some embodiments.

A rotating carousel 16 is shown behind the housing 11. The carousel 16 rotates a plurality racks holding the plurality of storage compartments within the housing to align various storage compartments with the access point 9. The carousel 16 is rotatable about a central axis, shown here as a post 17. Typically this rotation will be achieved by a motor (not shown) or other motive device in communication with the computerized user interface 10. Also shown behind the housing 11 is another of the plurality of racks 19 having a plurality of storage compartments 18.

Figure 2:
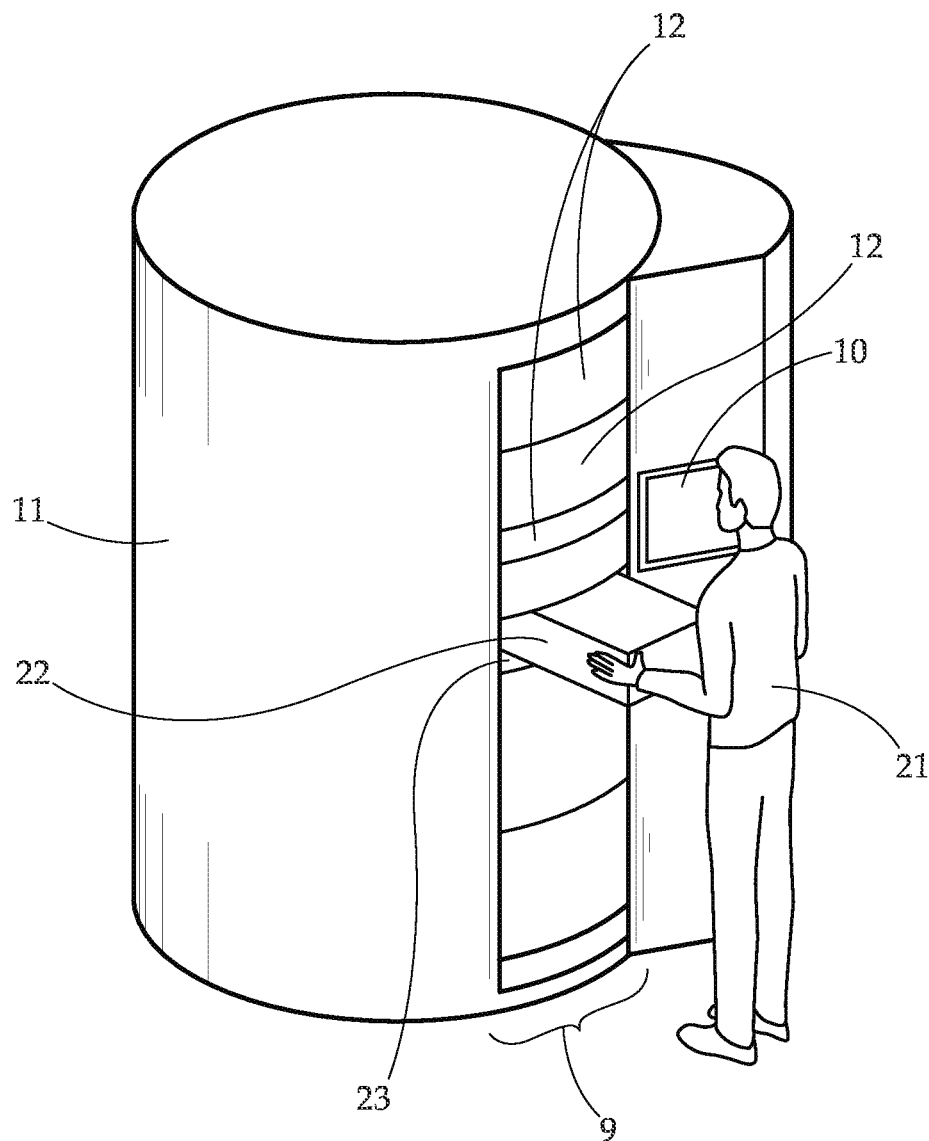
FIG. 2 provides a perspective view of another embodiment of the invention.

FIG. 2 shows another embodiment of the kiosk system of the present invention. In this embodiment a user 21 can be seen accessing a package 22 stored in storage compartment 23. The user 21 may be either loading or unloading the package 22. In this embodiment, doors 12 are all closed except the one that allows access to the storage compartment 23 only. As such, access point 9 of the kiosk housing 11 is secured except for the compartment the user 21 is allowed to access, as determined by the computerized user interface 10.

Figure 3:
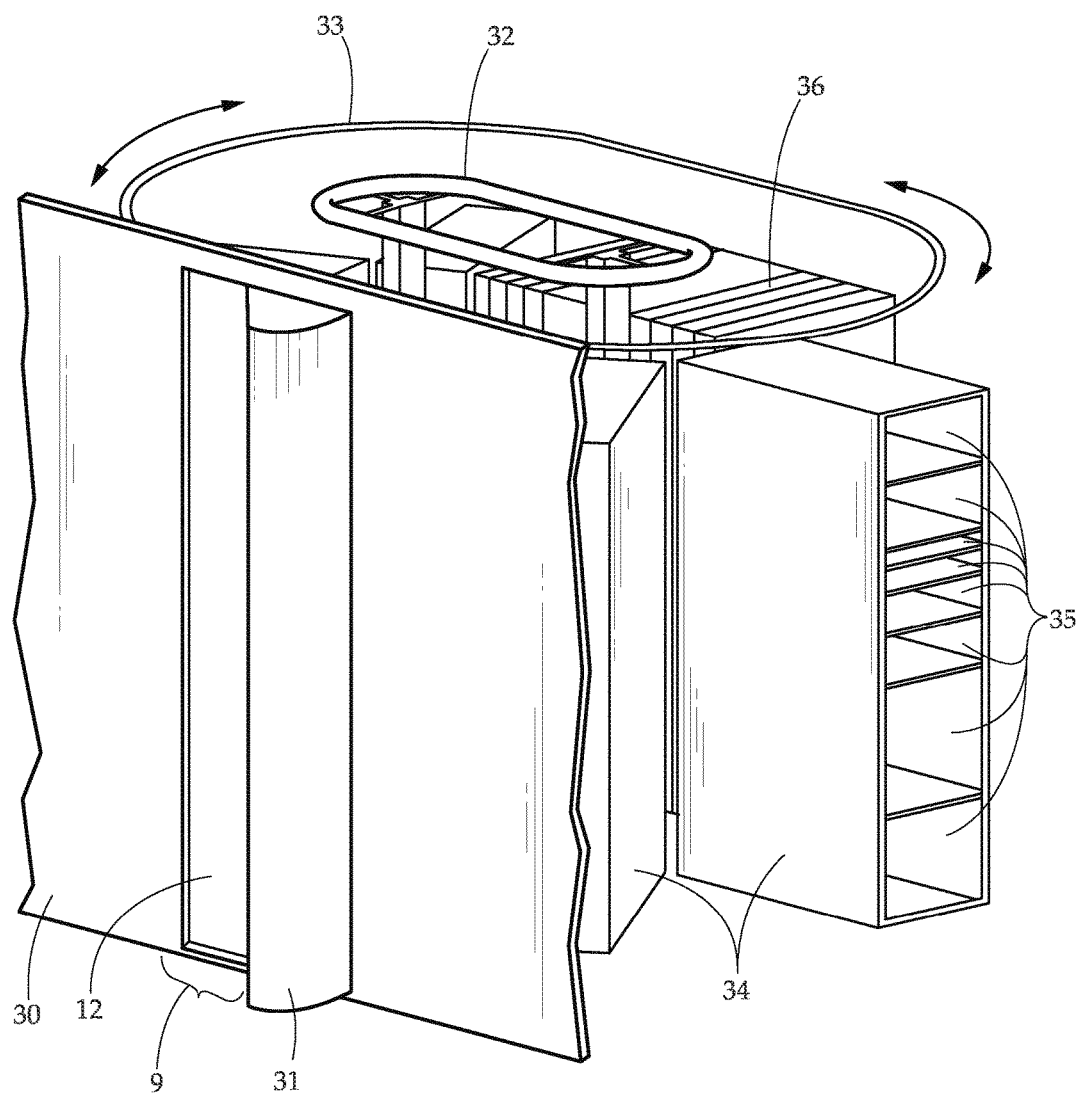
FIG. 3 provides a perspective cut-away view of yet another embodiment of the invention.

FIG. 3 provides a perspective view of another embodiment of the present invention. In this invention, the housing 30 is formed as a wall, with the operational parts of the system largely or entirely behind the wall 30. In this embodiment door (or doors) 12 cover access point 9. A panel 31 extends from housing 30 to allow for a more effective user interface (not shown) experience.

Behind the housing 30, a plurality of racks 34 are mounted to a conveyor system 33, 32. The conveyor in this embodiment is an overhead conveyor, which moves the racks 34 around guide 32 using a motor or other similar motive device (not shown). Upon command from the computerized user interface 10, the conveyor system 33, 32 moves the racks 34 such that a storage compartment 35 is aligned with access point 9. This view further shows a particular embodiment of storage compartments 36 which are tall and thin and are configured for the hanging of hung garments.

Figure 4:
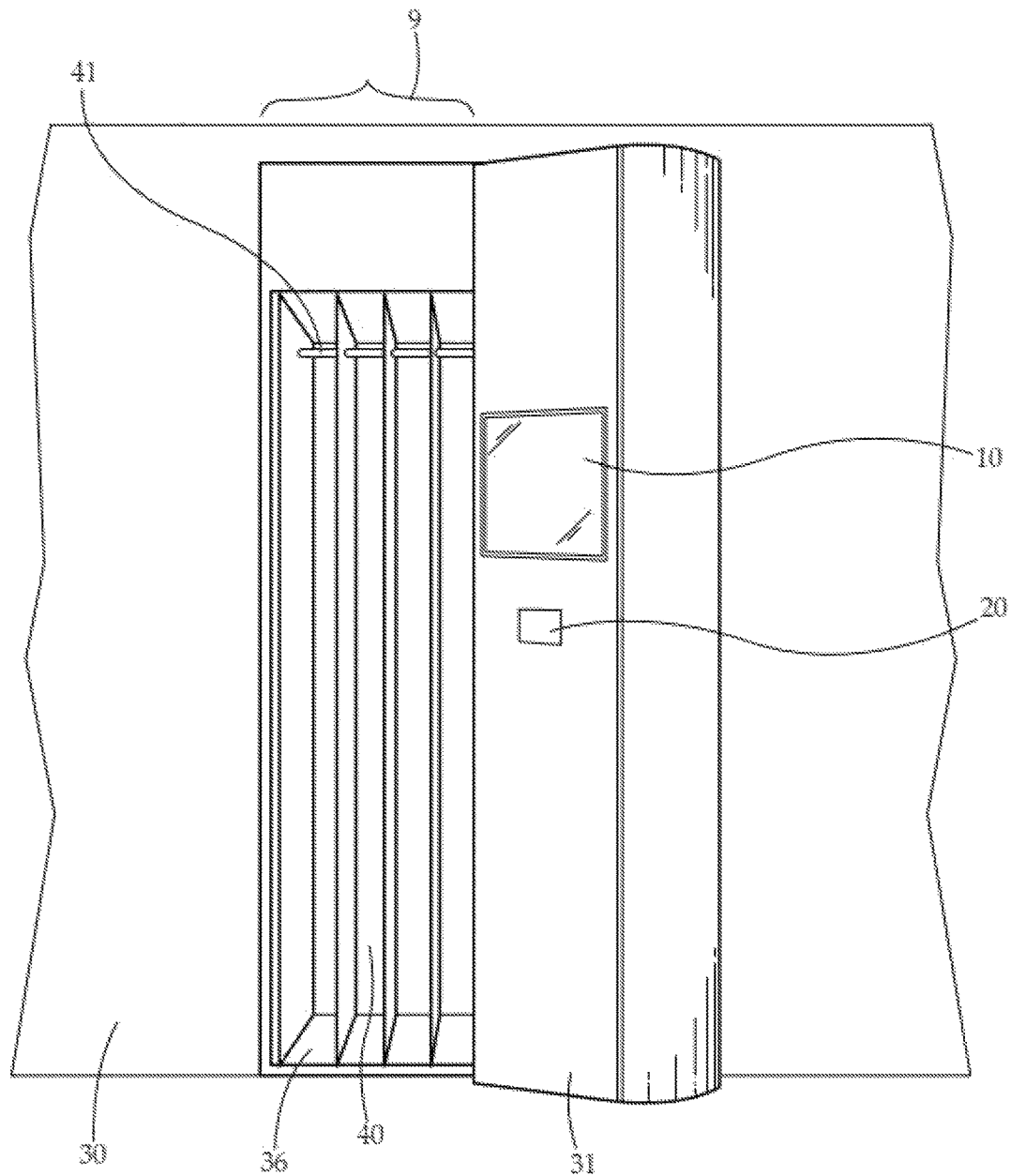
FIG. 4 provides a perspective view of still another embodiment of the invention.

FIG. 4 provides yet another view of the system contemplated herein. In this embodiment, the housing is shown as a wall 30. Access point 9 is shown in an open position with door (not shown) exposing more than one storage compartment 36. However, in other embodiments, door 12 may only partially open to expose just one storage compartment 36. The storage compartments shown in this view have a tall, thin region 40 for storing hung garments. Further, a hanger bar 41 is provided to allow hanging of the hung garments. User interface 10 and bar code scanner 20 can also be seen on panel 31.

Figure 5:
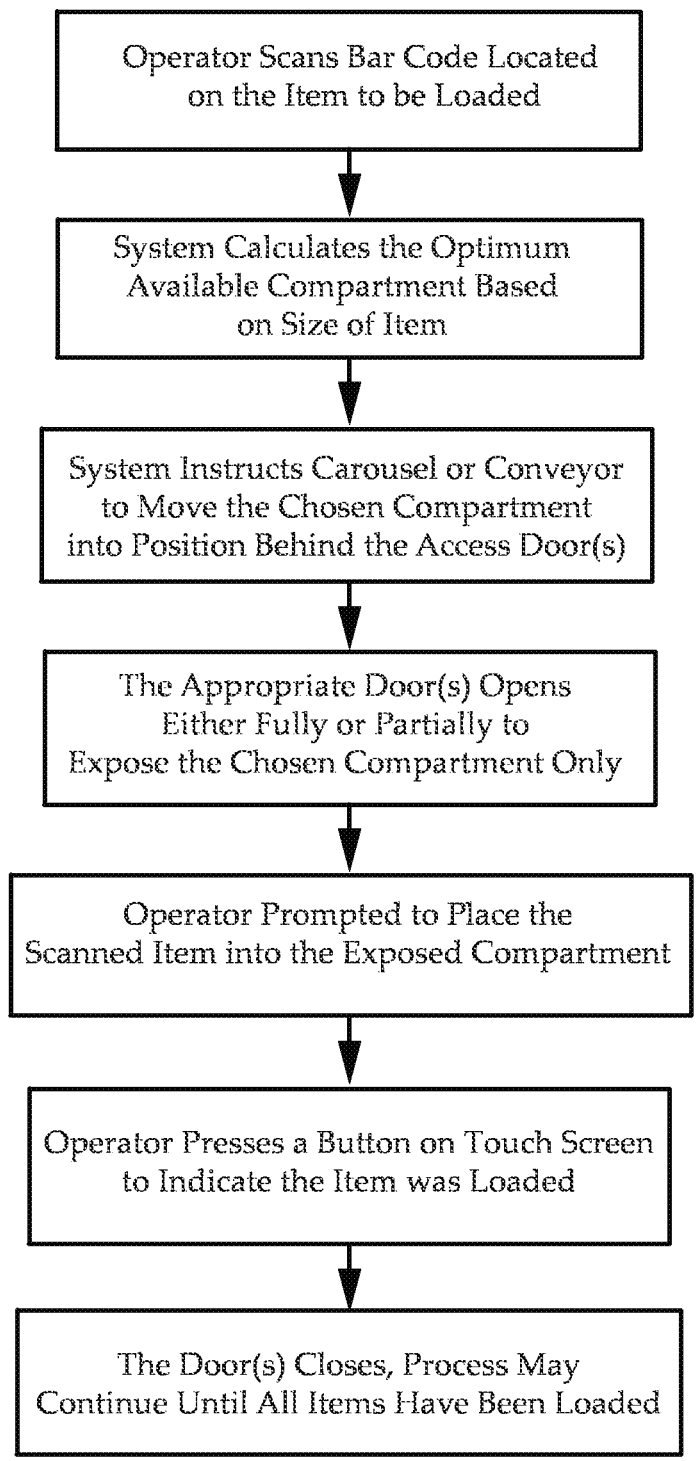
FIG. 5 provides a flow chart of an embodiment of the invention in use.

FIG. 5 provides a flow chart of one embodiment of use of the system. In particular, this use is an embodiment of the loading of a package into the system. Initially, an operator scans a bar code located on, or at least associated with, the item to be loaded. Based on the scan, information about the package may be determined, including size. The computerized user interface system then calculates the optimum compartment based on the size of the item. It should be understood that the computer(s) may perform this calculation either when a package is received/scanned-in at a distribution center, received/scanned-in at the system user interface, or when a user enters the package size on-line in embodiments wherein the user interface includes a remote, on-line access component. The computer then instructs the carousel or conveyor (or other movement device) to move the calculated and chosen compartment into position behind the access point and door(s). The door(s) opens to expose the compartment. Once opened, the operator may be prompted by the user interface to place the item into the compartment. The operator may then indicate to the user interface, for example by touching a button area on a touch screen, that the item was loaded. The door may then close, securing the item therein until it is picked up. In some embodiments, this process may repeat multiple times if, for example, the operator is loading a plurality of items into the system.

In a further loading embodiment, should the package that a user is loading not fit into the exposed compartment, the user may be presented with the option to input a "won't fit" command to the user interface. Upon activating this command in the user interface, the user may be presented with other available compartment sizes by the user interface. Once the new compartment size is selected, the door will close, and the new selected compartment may be oriented behind a door, and the door opened. The user may then load their package into this new compartment if its fits.

Figure 6:
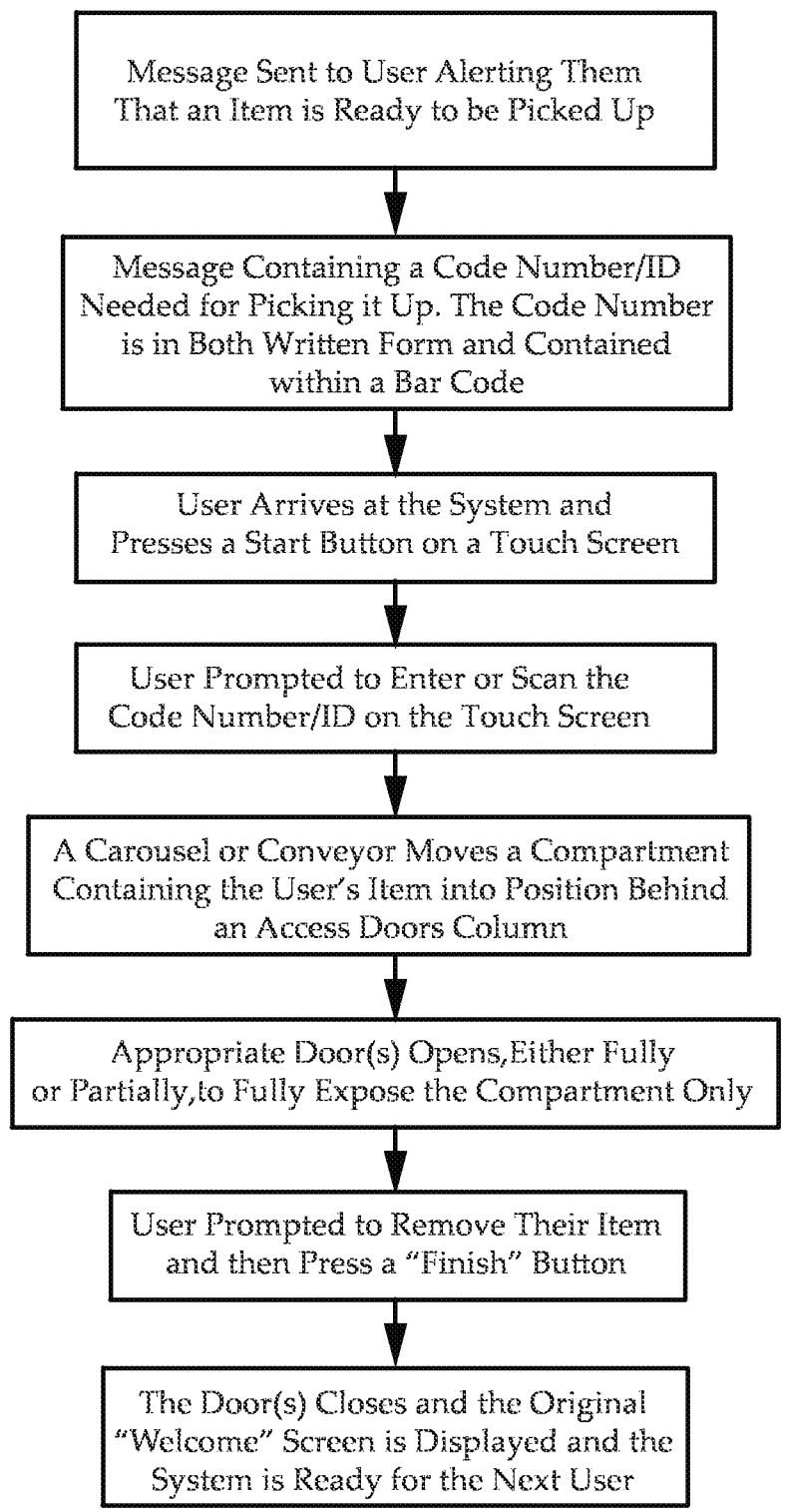
FIG. 6 provides a flow chart of another embodiment of the invention in use.

FIG. 6 provides a flow chart of one embodiment of use of the system. In particular, this use is an embodiment of the picking up of a package from the system. Initially, when the item is ready to be picked up, a message is sent to the user. The message may contain a code, a code number, or other identifying information needed for picking up the item from the system. In a particular embodiment, the code may be in both a written alphanumeric form, and as a bar code (QR code, and the like). Once the user arrives at the system's location, he or she may input the code, either by scanning the bar code, or inputting the code. Based on the code entered, a movement device such as a carousel or conveyor moves a compartment containing the user's item into position behind an access point covered by one or a plurality of access doors. The appropriate door or doors open, to expose the compartment and item therein. Once removed, the user may indicate that the transaction is finished by, for example, pressing a finish button or button area on the user interface. The door or doors may then close, and the system is ready for additional transactions.

The automated storage and retrieval system contemplated herein, particularly for carousel based embodiments, may be sized and configured so as to allow it to easily be shipped and placed into buildings or otherwise installed. In one embodiment, a unit may be approximately five feet in diameter, less than 80 inches tall, and will be separable into three or four section for shipping and entry through doorways and elevators. This embodiment may allow for easy assembly of the sections with one another once located on the installation site.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A package drop-off and pick-up system comprising:
 a housing;
 a plurality of storage compartments positioned within the housing;
 a movement device within the housing, the movement device configured to move the plurality of storage compartments within the housing, wherein the movement device is a motorized conveyor system, and wherein the plurality of storage compartments are mounted on the conveyor within the housing;
 an access point of the housing, wherein the access point is openable and closeable, providing access to one of the plurality of storage compartments in an open position, and preventing access in a closed position;
 a plurality of slideable doors covering the access point, the plurality of doors being slideable between closed, partially open, and fully open positions;
 a computerized user interface, the computerized user interface configured to:
  receive an input from a user;
  identify an appropriate one of the plurality of storage compartments based on the input from the user;
  activate the movement device to move the one of the plurality of storage compartments to be aligned with the access point;
  bring the access point to the open position, allowing access to the storage compartment; and
 bring the access point to the closed position after the user has accessed the storage compartment; and
  wherein the plurality of doors are automatically controlled by at least one controller, the at least one controller being capable of partially and fully opening and closing each of the plurality of doors, each one of the plurality of doors being independently controllable, the at least one controller being in communication with and activated by the computerized user interface.

2. The package drop-off and pick-up system of claim 1 wherein the user interface further comprises a touch screen.

3. The package drop-off and pick-up system of claim 1 wherein the movement device comprises a motor, the motor in communication with, and controlled by, the computerized user interface, and wherein the computerized user interface activates the motor for a period of time to move the one of the plurality of storage compartments in alignment with the access point.

4. The package drop-off and pick-up system of claim 1 wherein the housing is a walled room.

5. The package drop-off and pick-up system of claim 1 wherein at least one of the plurality of storage compartments is a tall thin compartment sized to receive one or a plurality of garments hung on a clothes hanger, and having a hooking point to hang the one or a plurality of garments hung on a clothes hanger.

6. The package drop-off and pick-up system of claim 1 wherein the user interface comprises a computerized remote interface, and a computerized on-site interface, the remote interface configured for receiving identifying information of the user and for receiving package information from the user, and configured to provide a code output to the user, the on-site interface is configured to receive the code as an input and, based on the code input, identify the appropriate one of the plurality of storage compartments.

7. The package drop-off and pick-up system of claim 1 wherein the computerized user interface is configured to identify the appropriate one of the plurality of storage compartments by calculating a smallest available compartment of the plurality of storage compartments that will fit a package based on a package size.

8. A method of dropping off a package to the package drop-off and pick-up system of claim 1 wherein the movement device is a conveyor and comprising the steps of:
 receiving, by the computerized user interface, an item identifier from a user;
 calculating, by at least one computer of the computerized user interface, an optimum available compartment of the plurality of compartments based on a size of the package, the size of the package being input to the user interface;
 activating a motor, by the computerized user interface, the motor moving the conveyor on which the plurality of storage compartments are attached, until the calculated storage compartment is aligned with at least part of the access point;
 opening, at least partially, a door to fully expose the compartment by a controller in communication with the computerized user interface;
 providing an output by the user interface prompting the user to place the package in the compartment;
 receiving an input by the computerized user interface by the user to confirm that the package is placed in the compartment; and
 closing the door fully by the controller upon the user interface receiving the input confirming that the package is in the compartment.

9. A method of picking up a package to the package drop-off and pick-up system of claim 1 wherein the movement device is a conveyor, and comprising the steps of:
 receiving, by the computerized user interface, an identification code provided by a user;

identifying, by at least one computer of the computerized user interface, the one of the plurality of compartments corresponding to the received identification code;

activating a motor, by the computerized user interface, the motor moving the conveyor until the identified storage compartment is aligned with at least part of the access point;

opening, at least partially, a door to fully expose the compartment by a controller in communication with the computerized user interface;

providing an output by the user interface prompting the user to remove the package from the compartment; and closing the door fully by the controller once the package is removed.

10. The method of claim 8 further comprising the step of providing the identification code to the user, by the computerized user interface via an electronic message.

11. The method of claim 8 wherein the system further comprises a plurality of slideable doors arranged horizontally and fully covering the access point, and wherein the step of opening the door comprises partially opening at least two of the plurality of doors to fully expose the storage compartment.

12. The method of claim 8 wherein the user interface comprises a computerized remote interface, and a computerized on-site interface, and further comprising the steps of:

receiving, by the remote user interface, identifying information of the user;

receiving, by the remote user interface, package information from the user;

providing, by the remote user interface, a code output to the user;

receiving, by the on-site user interface, the code output and, based on the code input; and identifying the appropriate one of the plurality of storage compartments.

13. The package drop-off and pick-up system of claim 1 wherein a first of the plurality of slideable doors is different in size from a second of the plurality of slideable doors.

14. The package drop-off and pick-up system of claim 13 wherein a first of the plurality of storage compartments is different in size from a second of the plurality of storage compartments.

15. A package drop-off and pick-up system comprising:
a housing, wherein the housing is a walled room;
a plurality of storage compartments positioned within the housing;
a movement device within the housing, wherein the movement device is a motorized conveyor system, the movement device configured to move the plurality of storage compartments within the housing, wherein the plurality of storage compartments are mounted on the conveyor within the housing a first of the plurality of storage compartments being different in size from a second of the plurality of storage compartments;
an access point of the housing wherein the access point is covered by a plurality of slideable doors, the plurality of doors being slideable between closed, partially open, and fully open position, the plurality of doors providing access to the storage compartment in an open position or partially open position, and preventing access in a closed position;
a computerized user interface, the computerized user interface configured to:
receive an input from a user;
identify an appropriate one of the plurality of storage compartments;
activate the movement device to move the one of the plurality of storage compartments to be aligned with the access point;
bring the access point to the open position, allowing access to the storage compartment; and
bring the access point to the closed position after the user has accessed the storage compartment;
wherein the plurality of doors are automatically controlled by a controller, the controller being capable of partially and fully opening and closing each of the plurality of doors, each of the plurality of doors being independently controllable, the controller being in communication with and activated by the computerized user interface; and
wherein the user interface comprises a computerized remote interface, and a computerized on-site interface, the remote interface configured for receiving identifying information of the user and for receiving package information from the user, and configured to provide a code output to the user, the on-site interface is configured to receive the code output and, based on the code input, identify the appropriate one of the plurality of storage compartments.

16. The package drop-off and pick-up system of claim 15 further comprising a first of the plurality of slideable doors being different in size from a second of the plurality of slideable doors.

* * * * *